United States Patent Office 3,252,955
Patented May 24, 1966

3,252,955
COMPLEX ALUMINUM COMPOUNDS CONTAINING FLUORINE ATOMS AS POLYMERIZATION CATALYSTS
John D. Calfee, Des Peres, Mo., assignor to Monsanto Company, a corporation of Delaware
No Drawing. Filed Dec. 5, 1961, Ser. No. 157,241
7 Claims. (Cl. 260—93.1)

This invention relates to novel compounds, and to their use as polymerization catalysts for the polymerization of olefinically unsaturated monomers.

As one aspect of the present invention, complex compounds are prepared by the combination of an aluminum alkyl compound with an oxygenated aluminum fluoride or aluminum chlorofluoride. The oxygenated aluminum halides useful for the preparation of my novel compounds have a portion of the halogen replaced by oxygen, or by oxygen and hydrogen, or by oxygen, hydrogen and carbon. Thus, the oxygenated aluminum halide can be described as an aluminum fluoride or aluminum chlorofluoride wherein a portion of the halogen is replaced by a hydroxyl group, an alkoxy group, an acyl group or by divalent oxygen.

In the preparation of oxygenated aluminum fluoride or oxygenated aluminum chlorofluoride, I have found that aluminum chloride is a convenient raw material. A portion of the chloride attached to the aluminum is replaced by an oxygen linkage in the first step and in a succeeding step, part or all of the remaining chlorine atoms are replaced by fluoride atoms. The oxygen linkage may be oxygen alone or may be oxygen and hydrogen in the form of a hydroxyl radical, or may be an alkoxy substituent containing oxygen, carbon and hydrogen, e.g., a methoxy, ethoxy, propoxy, or butoxy group, or may be a saturated monobasic aliphatic acyl radical containing oxygen, carbon and hydrogen such as formyl, acetyl or propionyl; the alkyl or acyl portion of the substitutent being of substantially any size up to approximately 6 carbon atoms per molecule. I prefer to use the hydroxylated compounds and the alkoxy compounds in the preparation of my catalyst compositions.

For the preparation of the hydroxy compound a solution is used consisting of anhydrous aluminum chloride dissolved in a suitable non-complex forming solvent which may be methyl chloride or ethyl chloride or other mono- or polyhalogenated alkane of up to about 5 carbon atoms per molecule. To the solution of aluminum chloride in lower alkyl chloride there is then added about 0.01 to 1.0 mole of water, preferably 0.2 to 1.0 mole in proportion to the amount of aluminum chloride present, to produce a partially hydroxylated aluminum chloride. This product, commonly referred to as basic aluminum chloride, may be the mono-hydroxylate such as $AlCl_2OH$, or may be mixtures of the mono-hydroxylate with small amounts of dihydroxylate such as $AlCl(OH)_2$, or the mixtures may also contain some unchanged aluminum chloride. Part of the anhydrous aluminum chloride is tied up in complex formation or in the form of a double salt. In addition small quantities of aluminum chloride monohydrate, $AlCl_3 \cdot H_2O$, can be formed. This material is not normally stable alone, but tends to form a complex with the basic aluminum chlorides with which it is fully stable. The amount of water added is such as to reduce the ratio of combined chloride to combined aluminum present in the hydroxylated catalyst below the 3:1 ratio as it occurs in anhydrous aluminum chloride, preferably to a value between 2:1 and 2.8:1. Instead of water as the reactant in the present preparation of basic aluminum chloride I can employ a dilute or concentrated hydrochloric acid with desirable results.

The reaction is conducted at a temperature below the freezing point of water. The water may be added in the form of finely-divided ice, or as a spray applied to the surface of the solvent and mixed into the solution with vigorous agitation. The added water combines with the aluminum chloride solution to displace chlorine through hydrolysis yielding an aluminum hydroxy chloride or a double salt of aluminum hydroxy chloride and aluminum trichloride, or a double salt of aluminum chloride monohydrate with the aluminum hydroxy chloride or the aluminum chloride or both. The chief product of this hydrolysis reaction is a product in which the chlorine to aluminum ratio is substantially less than 3:1. The hydrolyzed product, basic aluminum chlorides, obtained in this step remains soluble in the lower alkyl halide solvent and may be represented by one or more of the following empirical formulas:

$AlClO$
$AlCl_2OH$
$AlCl(OH)_2$
$AlClO \cdot AlCl_3$ or $Al_2Cl_4O$
$AlCl_2OH \cdot AlCl_3$ or $Al_2Cl_5OH$
$AlCl(OH)_2 \cdot AlCl_3$ or $Al_2Cl_4(OH)_2$
$AlCl_2OH \cdot AlClO$ or $Al_2Cl_3O(OH)$
$AlCl(OH)_2 \cdot AlClO$ or $Al_2Cl_2O(OH)_2$
$AlCl(OH)_2 \cdot AlCl_2OH$ or $Al_2Cl_3(OH)_3$
$Al_2Cl_2(OH)_4$
$Al_2Cl(OH)_5$ Fluorine is introduced into the molecule of the oxygenated aluminum chloride by the reaction of certain fluorine-containing compounds with the solution of oxygenated aluminum chloride prepared as described above. Under anhydrous conditions, hydrogen fluoride, boron trifluoride, benzotrifluoride, $C_6H_5CF_3$, and ethylidene fluoride, $CH_3CHF_2$, can be used to introduce fluorine into the molecule. By controlling the quantity of fluorinating agent introduced, I can replace all or part of the chlorine atoms with fluorine atoms to prepare the oxygenated aluminum chlorofluorides as well as the oxygenated aluminum fluorides. Representative hydroxylated aluminum chlorofluorides suitable for the preparation of my novel catalyst compositions include the following:

$AlClFOH$
$AlClFOH \cdot AlCl_3$
$AlClFOH \cdot AlClO$
$Al_2Cl_4FOH$
$Al_2Cl_3F_2OH$
$Al_2Cl_2F_3OH$
$Al_2ClF_4OH$
$Al_2Cl_3F(OH)_2$
$Al_2ClF_3(OH)_2$
$Al_2Cl_3F_2OH \cdot AlCl_2F$
$Al_2Cl_3F_2OH \cdot AlClO$
$Al_2ClF_4OH \cdot AlClF_2$
$Al_2ClF_4OH \cdot AlFO$ If an excess of fluorinating agent is used, or if sufficient fluorinating agent is used to substitute each chlorine atom, the following representative compounds, or double salts are obtained. Each of these materials can be used in preparing the catalyst compositions of my invention.

$AlFO$
$AlF_2OH$
$AlF(OH)_2$
$AlCO \cdot AlF_3$ or $Al_2F_4O$
$AlF_2OH \cdot AlF_3$ or $Al_2F_5OH$
$AlF(OH)_2 \cdot AlF_3$ or $Al_2F_4(OH)_2$
$AlF_2OH \cdot AlFO$ or $Al_2F_3O(OH)$
$AlF(OH)_2 \cdot AlFO$ or $Al_2F_2O(OH)_2$
$AlF(OH)_2 \cdot AlF_2OH$ or $Al_2F_3(OH)_3$
$Al_2F_2(OH)_4$
$Al_2F(OH)_5$ The progress of the fluorination reaction can be visibly followed by observing the formation of insoluble fluorine-containing material. The oxygenated aluminum chlorides are completely soluble in the lower alkyl chloride, whereas the compounds prepared by the fluorination step are insoluble in these solvents. As substitution of chlorine atoms with fluorine atoms takes place, the desired product is formed either as a precipitate or as an insoluble gel. The oxygenated aluminum fluorides and the oxygenated aluminum chlorofluorides are useful polymerization catalysts for the polymerization of olefinically unsaturated monomers to prepare high molecular weight polymer. These materials exhibit their catalytic activity in polymerization reactions conducted with a heterogenous system, that is, the polymerization reaction occurs on the surface of the catalytic agent. This unusual catalytic activity can be explained, at least in part, by the presence of the extremely high surface area possessed by these materials.

In my preferred method of preparing oxygenated aluminum chlorofluorides and oxygenated aluminum fluorides, the oxygenated aluminum chloride is treated with a fluorine-containing compound, for example, ethylidene fluoride at temperatures below 0° C. The reaction is conducted in excess alkyl halide diluent, and for convenience the refluxing alkyl halide can be used to maintain temperature control. In many instances the material formed by the fluorination reaction is so finely divided, absorptive, and of such high surface area that a gel is formed. Removal of the solvent and the by-product chloride-containing compounds under reduced pressure leave a dry, free flowing, finely-divided powder. The materials prepared by this procedure retain trace quantities of organic chlorides adsorbed on their surfaces. I have found that these materials have no seriously adverse effects on the activity of the catalyst, although in many instances catalytic activity is enhanced by their removal.

The fluorination reaction is conveniently conducted at a temperature ranging from about $-50°$ C. to about $150°$ C., preferably at about $-20°$ C. to about $10°$ C., at atmospheric pressure, but, when the reaction is carried out in an autoclave with an organic fluorinating agent, the temperature of reaction can be as high as about $150°$ C. or higher. However, I prefer to use a fluorination temperature of less than $75°$ C.

As a further embodiment of this invention the oxygenated aluminum chlorofluoride or oxygenated aluminum fluoride can be used as formed as a polymerization catalyst without evaporation of the alkyl halide solvent prior to transfer to the polymerization reactor. When this gel is added to an inert diluent the alkyl halide can optionally be evaporated after the gel is transferred.

I have found that the presence of moisture must be avoided in the reaction zone, when preparing these fluorine-containing catalyst components. Moisture has a detrimental effect, neutralizing the catalyst activity.

It is believed that the exceptional activity of the aluminum compounds precipitated as described above is due, at least in part, to the physical nature of materials as prepared. As they precipitate from solution in the formation step, they are in extremely finely-divided form. As a result, they are porous and possess great surface areas, and actually appear amorphous when viewed with a high-powered optical microscope. Catalysts prepared by the fluorination technique have been examined by X-ray diffraction technique, which reveals the presence of sub-microscopic crystals, known as crystallites. These crystallites have a radius of about 500 Angstrom units or lower, as determined by the technique of X-ray diffraction line broadening. Crystallite size measurements have further been confirmed by electron microscopy.

The fluorinated oxygenated aluminum compounds are useful as active polymerization catalysts. As one embodiment of this invention I have discovered a process for polymerizing aliphatic hydrocarbon monoolefin monomers of 2 to 6 carbon atoms, aliphatic diolefin monomers of 4 to 8 carbon atoms, mixtures of the aforesaid monoolefinic monomers with the diolefinic monomers, and alkyl vinyl ether monomers wherein the alkyl radical has from 1 to 10 carbon atoms, which comprises contacting said monomer or monomer mixture with a catalyst comprising a fluorinated oxygenated aluminum compound. These catalysts are useful for the polymerization of at least one olefin selected from the group consisting of ethylene and propylene to polymeric oils of particular application as lubricant fluids.

The oxygenated aluminum chlorofluorides and the oxygenated aluminum fluorides can be used as catalysts to polymerize isobutylene to high molecular weight solid polymer, and, they catalyze the polymerization of diolefins, e.g., butadiene, isoprene, to high molecular weight solid, rubbery polymer containing a surprisingly low percentage of cross-linked polymer. Thus these catalysts enable one to convert butadiene and/or isoprene to rubbery polymer which in the unvulcanized condition possesses a high degree of solubility in aromatic solvents. It will be understood that these rubbery polymers can be vulcanized by the procedure well known in the art for vulcanizing other natural and synthetic rubbers.

Furthermore, the oxygenated aluminum chlorofluorides and the oxygenated aluminum fluorides catalyze the copolymerization of isoolefins, especially isoolefins having 4 to 6 carbon atoms, with conjugated diolefins having 4 to 6 carbon atoms such as butadiene, isoprene, piperylene, or dimethyl butadiene. The copolymers obtained by the use of these catalytic materials can be used as a rubber for the manufacture of automobile tires, airplane tires and for the many other applications, where natural rubber is now employed.

Alkyl vinyl ethers, wherein the alkyl group contains from 1 to 10 carbon atoms are polymerized to high molecular weight solid polymer by contacting the alkyl vinyl ether monomer with a catalytic material comprising a fluorinated oxygenated aluminum compound prepared according to the procedures described herein.

I have demonstrated that the fluorinated oxygenated aluminum compounds can serve as the sole catalyst for the polymerization process of my invention; however, the catalytic activity can be further enhanced, if desired, by the addition of a trialkyl aluminum compound. Although I do not intend to limit the scope of my invention by any particular theory regarding the method or mechanism of the catalysts it appears that the activation effect or co-catalytic effect is gained due to complex formation between the trialkyl aluminum and the fluorinated oxygenated aluminum compound. This will be explained in greater detail herein below.

Suitable aluminum compounds to be used as co-catalysts with the fluorinated oxygenated aluminum compounds are those represented by the general formula: $R_3Al$, wherein R is an alkyl radical of from 2 to 12 carbon atoms. The three alkyl radicals can be the same or different. By way of example, but not limitation, the following compounds are useful in the present invention:

Triethylaluminum
Tripropylaluminum
Tributylaluminum
Triisobutylaluminum
Trihexylaluminum
Trioctylaluminum
Tridecylaluminum
Tridodecylaluminum
Diethylisobutylaluminum
Diethyloctylaluminum
Didodecyloctylaluminum It is to be understood that mixtures of the foregoing types of aluminum compounds can be employed and that the alkyl chains can be either straight or branched.

The molar ratio of trialkylaluminum compound to the fluorinated oxygenated aluminum compound can vary over a wide range, suitable values being from 0.1:1 to 10:1, on up to 15:1 or higher. It is generally preferred to use a mole ratio between 0.3:1 and 5:1. When stoichiometric quantities of the two materials are used, resulting in nearly quantitative formation of the catalyst complex, the mole ratio of these two reactants is, of course, 1:1.

The active catalyst can be prepared by a variety of procedures, the simplest and perhaps most effective being the addition of the trialkylaluminum compound in inert diluent to the fluorinated oxygenated aluminum compound which may be suspended in an inert diluent or used as the dry powder. The combined catalyst can then be used for the polymerization reaction as a suspension or solution in an inert organic solvent. Such solvents can suitably be saturated aliphatic and alicyclic and aromatic hydrocarbons, halogenated hydrocarbons, and saturated ethers. The hydrocarbon solvents are generally preferred. If desired, the lower alkyl halide used for the preparation of the fluorinated oxygenated aluminum compound can be used as the inert diluent for the polymerization reaction. Suitable hydrocarbon solvents include liquefied ethane, propane, isobutane, normal butane, normal hexane, the various isomeric hexanes, isooctane, cyclohexane, methyl cyclopentane, dimethyl cyclohexane, dodecane, industrial solvents composed of saturated and/or aromatic hydrocarbons, such as kerosenes, naphthas, etc., especially when hydrogenated to remove the olefin compounds and other impurities, and especially those ranging in boiling point up to 600° F. Also benzene, toluene, ethyl benzene cumene, decalin, ethylene dichloride, chlorobenzene, diethyl ether, ortho-dichlorobenzene, dibutyl ether, tetrahydrofuran, dioxane. In some instances, it is also advantageous to prepare the catalyst in the presence of a monomer to be polymerized.

It may also be mentioned here that polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per one part by weight total polymer produced, solvent recovery steps are obviated or minimized with consequent advantage. It is often helpful in obtaining efficient contact between monomer and catalyst and in aiding removal of heat of reaction, to employ larger amounts of solvent, for example, from 5 to 30 parts by weight solvent per one part by weight total polymer produced. These inert solvents, which are solvents for the monomers, some of the catalyst components, and some of the polymers, but are non-solvents for many of the polymers, can also properly be termed inert liquid diluents, or inert organic liquids.

The amount of catalyst required is dependent on the other variables of the particular reaction, such as the purity of monomer and/or solvent, and although amounts as small as 0.01 weight percent based on total weight of monomers charged are sometimes permissible, it is usually desirable to use somewhat larger amounts, such as from 0.1 up to 2.5 percent or even higher, say, up to 20 percent, depending upon the monomer or monomers, the presence or absence of solvent, the temperatures, pressures and other reaction conditions. When polymerization is effected in the presence of a solvent, the catalyst to solvent weight ratio should be at least about 0.001:1 although even lower values can sometimes be used.

The polymerization of monomer in the presence of my novel catalyst can be effected over a wide range of temperatures, again the particular preferred temperatures being chosen in accordance with the monomer, pressure, particular catalyst and other reaction variables. For many monomers any temperatures down to say −80° C. and even lower are suitable and in many cases it is preferred that the temperature be maintained at below about 35° C. However, for other monomers, particularly ethylene and/or propylene, higher temperatures appear to be optimum, say from 50° C. to 150° C.

The pressure at which the polymerization is carried out is dependent upon the chosen monomer or monomers, as well as other variables. In most instances, the polymerization is suitably carried out at atmospheric pressure or higher. Pressures ranging from atmospheric up to several hundred or even many thousand pounds per square inch are suitable. While high pressures are not required in order to obtain a reaction, they will have a desirable effect on reaction rate and, in some instances, on polymer quality. The choice of whether or not to use an appreciably elevated pressure will be one of economic and practical consideration taking into account the advantages that can be obtained thereby.

The catalysts described herein are sensitive to various poisons, among which may be mentioned alcohols, ketones, water, acetylenic compounds such as acetylene, vinyl acetylene, and the like. For this reason suitable precautions should be taken to protect the catalyst and the reaction mixture from excessive contact with such materials. An excess of the trialkylaluminum compound tends to give a certain amount of protection against these poisons. The monomers and diluents or solvents should be reasonably free from poisons. However, best results are ordinarily obtained if the monomer feed contains at least 90 weight percent and preferably higher of the polymerizable monomer, exclusive of any solvent material.

The monomer or mixture of monomers is contacted with the catalyst in any convenient manner, preferably by bringing the catalyst and monomer together with intimate agitation provided by suitable stirring or other means. The agitation can be continued during the polymerization, or in some instances, the polymerization mixture can be allowed to remain quiescent while the polymerization takes place. In the case of the more rapid reactions with the more reactive monomers, means can be provided for refluxing monomer and solvent to remove the heat of reaction. In any event, adequate means should be provided for dissipating the exothermic heat of polymerization.

The polymerization can be effected in the batch manner, or in a continuous manner, such as for example, by passing the reaction mixture through an elongated reaction tube which is contacted externally with suitable cooling means to maintain the desired reaction temperature; or by passing the reaction mixture through an equilibrium-overflow reactor, or a series of the same.

As previously described, the addition of a trialkylaluminum compound to a fluorinated oxygenated aluminum compound results in complex formation in certain cases. In some instances it is believed that a chemical reaction occurs according to one or more of the following equations:

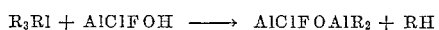
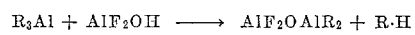

The trialkylaluminum reacts with hydroxy groups of the fluorinated oxygenated aluminum compounds in some instances to give new compounds, or a material having strong hydrogen bonding may be produced. The reaction mass can be a mixture of double salts, actual chemical reaction products and loosely-bonded materials joined as complexes. The exact nature of the material is not critical to the invention inasmuch as the material obtained by the union of the two compounds has pronounced activity as a polymerization catalyst. These materials additionally have activity in other hydrocarbon conversion processes, e.g., isomerization, alkylation, etc.

In order to illustrate some of the various aspects of the invention and to serve as a guide in applying the invention, the following specific examples are given. It will of course be understood that variations from the particular temperatures, pressures, diluents and proportions can be made without departing from the invention.

*Example 1*

A glass reactor immersed in a cooling bath was charged with 53.3 g., 0.4 mole, anhydrous aluminum chloride in 1100 ml. ethyl chloride to prepare a nearly saturated clear solution. This solution was cooled to a temperature of about −30° C. and treated by the addition of 7.2 g., 0.4 mole, water added as a finely-divided spray while stirring the solution vigorously. The reactants were permitted to slowly warm up to the temperature of refluxing ethyl chloride while maintaining vigorous agitation. Refluxing was continued until essentially all the by-product HCl boiled off in accordance with the equation $$AlCl_3 + H_2O \rightarrow AlCl_2OH + HCl$$

The oxygenated aluminum chloride so prepared remained essentially soluble in ethyl chloride. This solution was divided into four equal portions for the fluorination step, described in the following examples.

*Example 2*

To an aliquot of basic aluminum chloride from Example 1, calculated to contain 0.1 mole $AlCl_2OH$, cooled to −78° C., was added 2.0 g., 0.1 mole, hydrogen fluoride with thorough mixing. The reactants were permitted to warm up slowly to the temperature of refluxing ethyl chloride, at which point formation of insoluble product was observed. The fluorinated material formed as a gel or as a finely-divided solid depending upon the rate of reaction. Refluxing of the ethyl chloride was continued to boil off the bulk of the by-product hydrogen chloride. The halogen interchange reaction can be represented by the following equation $$AlCl_2OH + HF \rightarrow AlClFOH + HCl$$

Fluorinated oxygenated aluminum chloride prepared according to this example is suitable as prepared for use as a heterogeneous catalyst, i.e., as a dispersion in the ethyl chloride without further treatment. For the polymerization of certain monomers the diluent can be stripped off at reduced pressures to insure that essentially all of the by-product hydrogen chloride is removed. This product can be identified as basic aluminum chlorofluoride or oxygenated aluminum chlorofluoride.

*Example 3*

An aliquot of basic aluminum chloride from Example 1, containing a calculated content of $AlCl_2OH$ of 0.1 mole, was cooled to −78° C. To this solution was added 13.2 g., 0.20 mole, ethylidene fluoride to convert all of the chloride atoms to fluoride atoms. As the reactants were stirred and permitted to warm up to the temperature of refluxing ethyl chloride, halogen interchange took place resulting in the formation of insoluble fluorinated product. The reaction can be represented by the equation $$AlCl_2OH + CH_3CHF_2 \rightarrow AlF_2OH + CH_3CHCl_2$$

The solvent was removed by a stripping operation and the product subjected to a vacuum treatment at room temperature to remove trace quantities of hydrogen chloride, ethylidene fluoride, and by-product ethylidene chloride.

*Example 4*

To an aliquot of the basic aluminum chloride solution from Example 1, containing a calculated quantity of 0.1 mole $AlCl_2OH$ and cooled to −78° C. was added 0.05 mole gaseous $BF_3$ with stirring. The reactants were permitted to warm up to the temperature of refluxing ethyl chloride.

The product in this example formed as a voluminous gel. The catalyst was recovered in the form of finely-divided powder by stripping off ethyl chloride and by-product boron trichloride, and subjecting the product to high vacuum at room temperature to remove trace quantities of asorbed by-product boron trichloride. In this example the halogen interchange reaction can be represented by the following equation $$2AlCl_2OH + BF_3 \rightarrow AlClFOH + AlF_2OH + BCl_3$$

*Example 5*

The polymerization catalyst activity of the solution prepared in Example 2 was demonstrated for various monomers by employment of the following procedure:

For each monomer, a 500 ml. autoclave was charged with 200 ml. anhydrous hexane and an aliquot of the AlClFOH dispersion in ethyl chloride corresponding to 2.0 g. of the basic aluminum chlorofluoride. The autoclave was sealed, cooled, and monomer then introduced through a valve. After the polymerization reaction was conducted, the polymerization catalyst was quenched by the addition of excess methanol and the polymer recovered. The following results were obtained with various monomers under the conditions indicated.

(A) Ethylene was charged as a gas to the above catalyst system until a pressure of 1000 p.s.i. was reached at 10° C. The autoclave was then permitted to warm up to room temperature under autogenous pressure, while shaking in a rocking mechanism during a period of three hours. A high boiling viscous oil was isolated from this polymerization.

(B) Isoprene was used as the monomer except that the polymerization temperature was maintained between −78° C. and −25° C. under autogenous pressure. A solid high molecular weight polymer was obtained that was generally insoluble in organic solvents indicating that the polymerization reaction yielded a comparatively high percentage of cross-linked polymer.

(C) When the monomer charged was methyl vinyl ether, and the polymerization was conducted at 0 to 25° C. for two hours a solid high molecular weight polymer was obtained.

(D) Copolymerization was conducted by charging the reactor with equal quantities by weight of propylene and isoprene at −78° C. and allowing the autoclave to warm up to room temperature. After the purification step, a viscous oil, soluble in hydrocarbon solvents, was obtained. This oil, when spread to a film on glass, "dried" to a solid film, indicating that this propylene/isoprene copolymer has characteristics of a drying oil for use in paints, etc.

*Example 6*

The dry powdered product from Example 3 was used as a polymerization catalyst following the general procedure of Example 5. For each polymerization run the autoclave was charged with 2.0 g. $AlF_2OH$, the product from Example 3, along with 100 ml. anhydrous hexane. The autoclave for each run, was sealed, cooled, and monomer then added. After the polymerization was completed the catalyst was quenched with excess methanol and the polymer isolated after filtering and washing.

(A) The reactor was pressurized with propylene at 0° C. and permitted to warm to room temperature with agitation provided by a rocking mechanism. The propylene monomer was converted to a viscous oil having properties of a lubricating oil.

(B) The autoclave, charged with 50 ml. bicycloheptadiene at −78° C., was maintained for 16 hours at −78° C. The reactor was then permitted to warm to room temperature and the catalyst quenched by the addition of a solution of aqueous HCl in methanol. The solid high molecular weight polymer obtained from this run was largely soluble in hot aromatic solvents indicating that only minor amounts of cross-linked polymer were formed.

(C) The autoclave, at −78° C., was charged with 50 g. isobutylene. The reactants were agitated for 6 hours at −78° C., and the autoclave then opened and the contents permitted to warm up to room temperature, boiling off unreacted isobutylene. After the washing and extracting steps a rubbery solid polyisobutylene polymer was obtained.

*Example 7*

In this example the product prepared in Example 4 is used as a polymerization catalyst following the general procedures of Examples 5 and 6.

(A) Propylene monomer was converted to a viscous oil with this catalyst at temperatures up to 50° C.

(B) A copolymer of propylene with isoprene was prepared with this catalyst at room temperature, said copolymer being characterized by complete miscibility in organic hydrocarbon solvents. This liquid material dried to a hard brittle film from being exposed to the atmosphere for several days, this indicating characteristics of a drying oil for surface coating compositions.

(C) Alkyl vinyl ethers wherein the alkyl group had from 1 to 4 carbon atoms, were converted to solid, form stable, high molecular weight polymers when the polymerization was conducted at or near room temperature.

*Example 8*

Dry oxygenated aluminum chlorofluoride, AlClFOH, prepared according to the procedure of Example 2, 9.8 g., 0.1 mole, was dispersed in 500 ml. ethyl chloride at −78° C. in a glass reactor. To this dispersion was added, dropwise with good stirring, 19.8 g., 0.1 mole, triisobutylaluminum. The reaction mixture became homogeneous and remained uniform as the temperature was permitted to rise to the boiling point of ethyl chloride. The solution was warmed to room temperature to distill off trace quantities of ethyl chloride. The product that remained was a uniform liquid and showed no tendency to crystallize at low temperatures, indicating that a complex or reaction product had formed.

A glass reactor was charged with 8.2 g. AlF$_2$OH, 0.10 mole, prepared according to Example 3, and 11.4 g., 0.1 mole, Al(C$_2$H$_5$)$_3$. These two reactants were sealed in the reactor in an atmosphere of dry nitrogen and maintained at 35–40° C. for 24 hours. At the end of this time a uniform clear liquid product was obtained. This product was soluble in common organic solvents such as hexane, benzene, toluene, diethyl ether, and dioxane.

*Example 9*

A glass reactor immersed in a dry ice-acetone bath was charged with 100 ml. hexane, 2.0 g. of the AlClFOH triisobutylaluminum complex of Example 8 and 20 g. isoprene. As the reaction mixture was warmed up to −25° C. a polymer slurry formed. Reaction was continued for 3 hours at −25° C. and the catalyst then quenched by the addition of hydrochloric acid solution in methanol. The polyisoprene was purified by precipitation from a hot toluene solution. The rubbery polymer obtained in this run was characterized by almost complete absence of cross-linking, as indicated by its high solubility in hot toluene.

*Example 10*

Qualitative runs were made to determine the effectiveness of the AlF$_2$OH/aluminum triethyl catalyst composition prepared in Example 8. Solid high molecular weight polymers were prepared using this catalyst with ethylene at temperatures up to 50° C., and ethylene/propylene copolymers at 50° C. This catalyst also was effective in polymerizing alkyl vinyl ethers to solid high molecular weight polymer at temperatures from 25 to 50° C.

The catalyst complexes obtained by mixing equimolar quantities of an oxygenated fluorinated aluminum compound with an aluminum trialkyl are generally soluble materials. Catalyst compositions having high activity as heterogeneous catalyst can be prepared by employment of less than a stoichiometric quantity of the aluminum trialkyl. Thus, it is possible to prepare these catalyst compositions which are effective either as homogeneous catalysts or as heterogeneous catalysts. Generally, the catalytic activity of the oxygenated fluorinated aluminum compounds is considerably enhanced by the addition of an aluminum trialkyl.

It will be understood that the oxygenated aluminum compounds charged to the fluorination step can be prepared from anhydrous aluminum chloride and monobasic alcohols or the low members of the monobasic aliphatic acid series at temperatures ranging from about −25° C. to +75° C. The required reaction time ranges from several minutes to several days, depending upon the reactant employed.

While the invention has been described with particular reference to preferred embodiments thereof, it will be appreciated that variations from the details given herein can be effected without departing from my invention in its broadest aspects.

What is claimed is:

1. The process for polymerizing at least one monomer selected from the group consisting of aliphatic hydrocarbon olefins of 2 to 6 carbon atoms, aliphatic diolefins of 4 to 8 carbon atoms, and alkyl vinyl ethers wherein the alkyl radical has from 1 to 10 carbon atoms which comprises contacing said monomer with a catalyst consisting essentially of a fluorinated oxygenated aluminum compound selected from the group consisting of hydroxylated aluminum fluorides and hydroxylated aluminum chlorofluorides and a trialkylaluminum of the formula AlR$_3$ wherein each R is an alkyl radical of from 2 to 12 carbon atoms.

2. The process of claim 1 wherein the monomer is isobutylene.

3. The process of claim 1 wherein isobutylene is copolymerized with a diolefin of 4 to 8 carbon atoms.

4. The process of claim 1 wherein the catalyst consists essentially of one molar proportion of an aluminum compound selected from the group consisting of hydroxylated aluminum fluorides and hydroxylated aluminum chlorofluorides and from 0.1 to 10 molar proportions of a compound of the formula AlR$_3$ wherein each R is an alkyl radical of from 2 to 12 carbon atoms.

5. A polymerization catalyst composition consisting essentially of one molar proportion of a fluorinated oxygenated aluminum compound selected from the group consisting of hydroxylated aluminum fluoride and hydroxylated aluminum chlorofluorides together with from 0.1 to 10 molar proportions of an aluminum compound of the formula AlR$_3$ wherein each R is an alkyl radical of from 2 to 12 carbon atoms.

6. Process for polymerizing propylene which comprises contacting propylene with a catalyst consisting essentially of a fluorinated, oxygenated aluminum compound selected from the group consisting of hydroxylated aluminum fluorides and hydroxylated aluminum chlorofluorides and a trialkylaluminum of the formula AlR$_3$ wherein each R is an alkyl radical from 2 to 12 carbon atoms.

7. Process for polymerizing bicycloheptadiene which comprises contacting bicycloheptadiene with a catalyst consisting essentially of a fluorinated, oxygenated aluminum compound selected from the group consisting of hydroxylated aluminum fluorides and hydroxylated aluminum chlorofluorides and a trialkylaluminum of the formula $AlR_3$ wherein each R is an alkyl radical from 2 to 12 carbon atoms.

References Cited by the Examiner

UNITED STATES PATENTS

| | | | |
|---|---|---|---|
| 2,542,610 | 2/1951 | Young | 260—91.1 |
| 2,644,798 | 7/1953 | Calfee | 252—429 |
| 2,959,557 | 11/1960 | Hansford | 252—422 |
| 2,987,511 | 6/1961 | Arrigo | 260—94.9 |
| 2,989,487 | 6/1961 | Truett | 260—94.9 |

OTHER REFERENCES

Brewster: "Organic Chemistry," Second edition, 1955, page 56 relied on.

Webster's Third New International Dictionary, unabridged 1965, page 1571 relied on.

JOSEPH L. SCHOFER, *Primary Examiner.*

JAMES A. SEIDLECK, *Examiner.*